United States Patent [19]

Neudecker et al.

[11] 3,817,608
[45] June 18, 1974

[54] MOTION PICTURE CAMERA WITH ADJUSTABLE SHUTTER

[75] Inventors: Karl Neudecker; Anton Theer, both of Munich, Germany

[73] Assignee: Agfa-Gevaert Aktiengesellschaft, Leverkusen, Germany

[22] Filed: Dec. 14, 1972

[21] Appl. No.: 315,163

[30] Foreign Application Priority Data
Dec. 14, 1971 Germany.............................. 2161911

[52] U.S. Cl.................. 352/78 C, 352/216, 354/21
[51] Int. Cl. .......................................... G03b 17/26
[58] Field of Search.......... 352/72, 78 R, 78 C, 216; 95/31 FS, 10 FS

[56] References Cited
UNITED STATES PATENTS

| | | | |
|---|---|---|---|
| 3,125,939 | 3/1964 | Bundschuh et al................ | 95/31 FS |
| 3,481,259 | 12/1969 | Langnau et al.................... | 95/10 FS |
| 3,500,731 | 5/1970 | Bresson et al..................... | 95/31 FS |
| 3,601,024 | 8/1971 | Page................................. | 95/10 FS |

Primary Examiner—Samuel S. Matthews
Assistant Examiner—Russell E. Adams, Jr.
Attorney, Agent, or Firm—Michael S. Striker

[57] ABSTRACT

A motion picture camera for use with film-containing cassettes having externally applied encoded information which is indicative of the sensitivity of confined film employs a scanning lever or slide which is displaced by the encoded information on a properly inserted cassette and thereby adjusts the size of the opening which is defined by the blades of a rotary shutter. This insures that the length of exposure times is a function of the sensitivity of film in the housing of the camera. A cassette containing highly sensitive film will cause the lever or slide to select relatively long exposure times so that the user can make exposures when the scene light is weak without using an electronic flash unit or an analogous source of artificial light. The exposure times will be relatively short when the camera contains film of average sensitivity which can be used in broad daylight whereby the selection of relatively short exposure times reduces the likelihood that the quality of exposures would be affected by camera shake. The camera is provided with an overriding knob which enables the user to adjust the shutter independently of the sensitivity of film in that cassette which is properly installed in the camera body.

13 Claims, 6 Drawing Figures

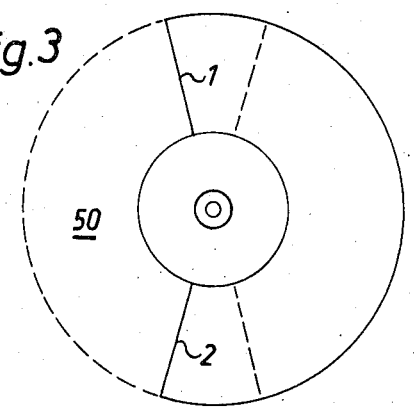
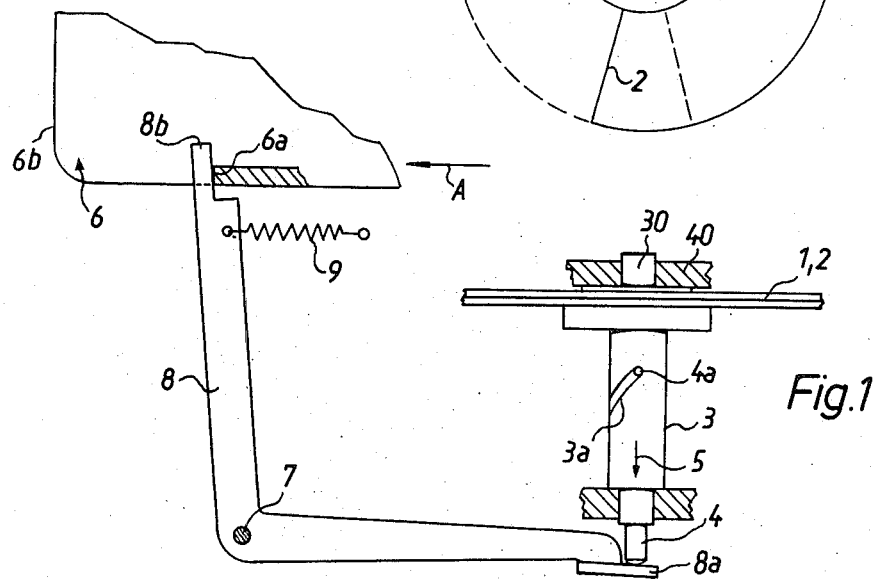
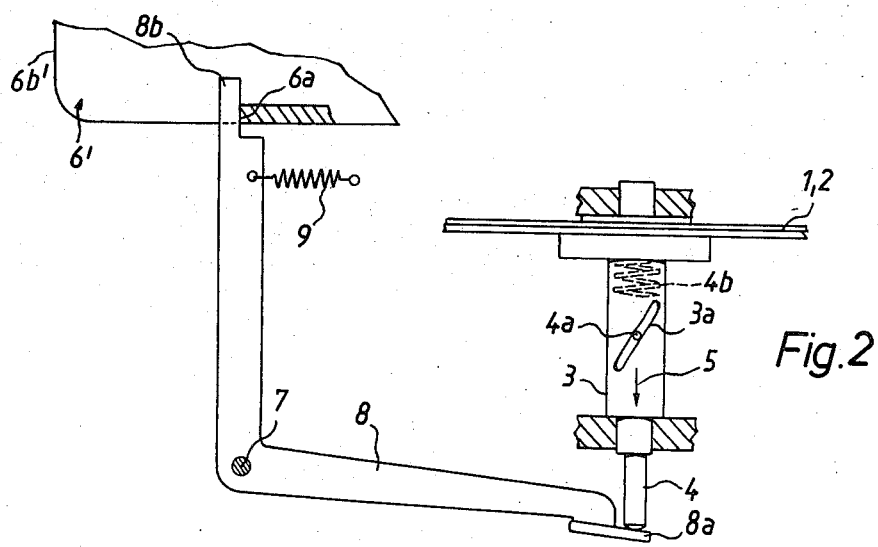

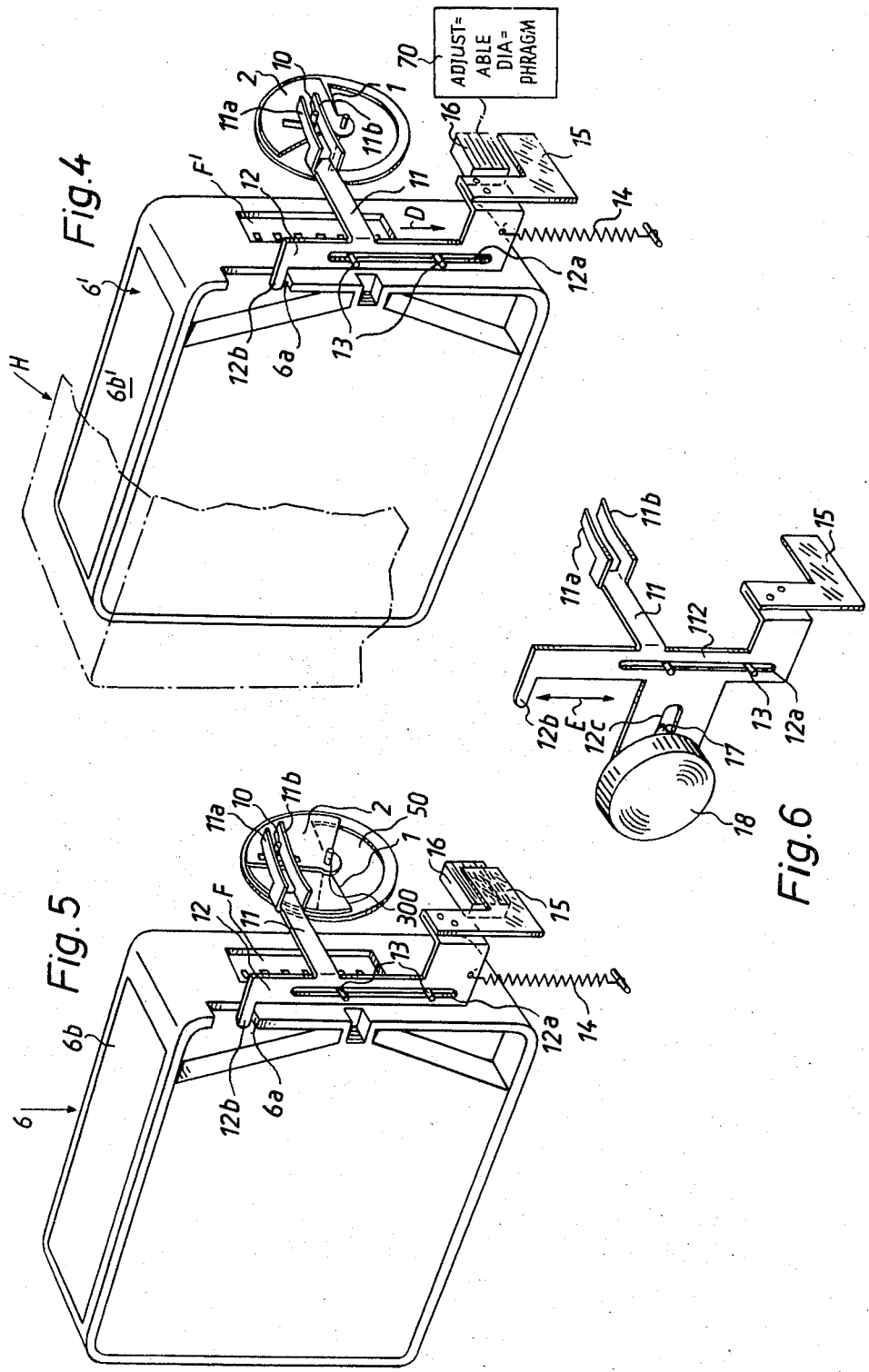

MOTION PICTURE CAMERA WITH ADJUSTABLE SHUTTER

BACKGROUND OF THE INVENTION

The present invention relates to photographic apparatus in general, and more particularly to improvements in motion picture cameras, especially to improvements in motion picture cameras utilizing 8-millimeter film. Still more particularly, the invention relates to improvements in motion picture cameras for use with receptacles (such as cassettes or cartridges) for convoluted motion picture film.

It is well known to provide a casette for motion picture film with encoded information in the form of notches, shoulders, ledges or the like which is indicative of a characteristic, such as the sensitivity, of confined film. The encoded information can be scanned by a detector which can adjust the diaphragm of the motion picture camera so that the size of the aperture is a function of the particular characteristic of film. It is further known to provide a motion picture camera with an adjustable shutter, especially if the camera is provided with means for the making of exposures with fade-in and/or fade-out effect. During the making of such exposures, the size of the light-admitting opening of the shutter is gradually reduced from a maximum size to zero size (exposures with fade-out effect) or is gradually enlarged from zero size to maximum size (exposures with fade-in effect). The adjustment of the shutter can be effected by hand or automatically, for example, by coupling the shutter adjusting mechanism to the motor which drives the film transporting mechanism or to a separate motor.

The adjustment of the shutter during the making of normal exposures is such that the blades of the shutter define an opening of maximum size. The size of the opening then determines the length of exposure times at a given shutter speed. Thus, if the film is transported at the speed of 24 frames per second and the shutter is a rotary shutter which completes 24 revolutions per second, the size of the aperture will determine whether the length of exposure times is 1/60 second or another fraction of a second.

Certain recently developed types of motion picture film are sufficiently sensitive to permit the making of exposures without an electronic flash unit or an analogous source or artificial light when the scene brightness is extremely low. However, the making of such exposures without artificial illumination of the subject (or with weak artificial illumination of the subject) is possible only if the shutter can furnish relatively long exposure times. This, in turn, renders it necessary to weaken the intensity of incoming light when the exposures are being made in broad daylight, even if the highly sensitive film is replaced with a motion picture film of average sensitivity. Therefore, such cameras must be provided with suitable filters or other light weakening means which are placed across the path of incoming light when the exposures are being made in broad daylight, either with a film of relatively high or with a film of average or relatively low sensitivity. The length of exposure times remains unchanged because the exposure times can be changed only during the making of exposures with fade-in or fade-out effect. This, in turn, often leads to the making of unsatisfactory exposures due to camera shake. The camera shake is likely to affect the quality of exposures even if the exposure time is as short as 1/60 second, i.e., an exposure time which is normally necessary for the making of exposures when the scene brightness is low, even if the sensitivity of motion picture film is extremely high.

SUMMARY OF THE INVENTION

An object of the invention is to provide a photographic apparatus, especially a motion picture camera for use with 8-millimeter film, with novel and improved means for automatically changing the exposure times as a function of a selected characteristc of motion picture film so that the length of exposure times which are furnished by the adjustable shutter is best suited for the making of exposures at the prevailing scene brightness and with any one of a variety of motion picture films.

Another object of the invention is to provide a motion picture camera wherein the shutter can be automatically adjusted not only for the making of exposures with lap dissolve but also as a function of a selected characteristic of that motion picture film which has been inserted into the camera.

A further object of the invention is to provide a novel and improved camera for use with motion picture film which is stored in receptacles having encoded information indicating a particular characteristic of film which is confined therein.

An additional object of the invention is to provide a motion picture camera with novel and improved means for adjusting the shutter without necessitating any attention on the part of the user.

Still another object of the invention is to provide a motion picture camera which can make satisfactory exposures without camera shake even if the shutter speed is such that one could expect the camera shake to affect the quality of exposures.

The invention is embodied in a photographic apparatus for use with cassettes or analogous receptacles containing motion picture film and having encoded information which is indicative of a characteristic (particularly the sensitivity) of motion picture film therein. The apparatus comprises a housing or body which is arranged to receive and support receptacles containing films of different characteristics (e.g., films of average or high sensitivity), adjustable mobile shutter means (preferably a rotary shutter) mounted in the housing and defining a light-admitting opening of variable size so that, at a given speed of the shutter means, the size of the opening determines the length of exposure times furnished by the shutter means, adjusting means mounted in the housing and being actuatable to adjust the shutter means, and information scanning actuating means (e.g., a pivotable lever or a reciprocable motion transmitting member) mounted in the housing to actuate the adjusting means and to thus effect an adjustment of the shutter means as a function of the characteristic of motion picture film in that receptacle which is properly mounted in the housing, i.e., whose information is scanned by the actuating means.

The actuating means or the adjusting means may further serve to adjust a diaphragm as a function of the characteristic of film in the receptacle whose information is scanned by the actuating means, and the apparatus may be provided with manually operable overriding means which can disengage the actuating means from the receptacle in the housing so that the user of the apparatus can adjust the opening independently of the properly mounted receptacle.

The novel features which are considered as characteristic of the invention are set forth in particular in the appended claims. The improved photographic apparatus itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary sectional view of a motion picture camera with adjustable shutter which embodies one form of the invention and whose housing supports a cassette containing a first type of motion picture film;

FIG. 2 illustrates the structure of FIG. 1 but with a cassette which contains a different type of motion picture film;

FIG. 3 is a front elevational view of the adjustable shutter in the motion picture camera of FIG. 1 or 2;

FIG. 4 is a fragmentary perspective view of a second motion picture camera whose housing supports a cassette which is identical with the cassette of FIG. 2;

FIG. 5 illustrates the structure of FIG. 4 but with a cassette which is identical with the cassette of FIG. 1; and FIG. 6 is a perspective view of a detail in a third motion picture camera.

DESCRIPTION OF THE PREFERRED EMBODIMENTS

Referring first to FIGS. 1 to 3, there is shown a portion of a motion picture camera for use with 8-millimeter motion picture film. The camera comprises a housing or body including an internal partition or wall 40 which supports a rotary shutter having light obstructing elements or blades 1 and 2 rotatable about the axis of a common shaft 30. The blades 1 and 2 define a light-admitting opening 50 (see FIG. 3) whose size (and hence the length of exposure times furnished by the shutter) can be varied by changing the angular position of the blade 2 relative to the blade 1. The adjusting means for changing the angular position of the blade 2 with respect to the blade 1 comprises a hollow shaft 3 which surrounds the shaft 30 and normally rotates therewith. The shaft 3 has a helical slot 3a for the radial pin 4a of an axially movable input member 4 which is coaxial with the shaft 30. A spring 4b (FIG. 2) or analogous biasing means urges the input member 4 in the direction indicated by arrow 5. The spring 4b can be replaced by a biasing element which pulls (rather than pushes) the input member 4 in the direction indicated by the arrow 5. The input member 4 of the shutter adjusting means can be axially movably coupled to and then rotates with the shaft 30 which can be driven by the motor (not shown) of the motion picture camera at one or more selected speeds. At a given speed of the shaft 30, the shutter including the blades 1 and 2 furnishes a succession of exposure times of identical length. The length of exposure times can be changed by changing the speed of the shaft 30 and/or by changing the angular position of the blade 2 relative to the blade 1 to thereby increase or reduce the size of the opening 50, as considered in the circumferential direction of the shafts 30 and 3. The exact details of the mechanism which causes the blade 2 to move relative to the blade 1 about the axis of the shaft 30 in response to axial displacement of the input member 4 is known and, therefore, such mechanism is not shown in the drawing. It is assumed that the blade 2 turns in a counterclockwise direction (as viewed in FIG. 3) when the input member 4 moves in the direction indicated by the arrow 5 under the action of the spring 4b, and that the blade 2 moves clockwise when the input member 4 is depressed against the opposition of the spring 4b. In other words, the size of the opening 50 will increase (and the length of exposure times furnished by the shutter will also increase) if the input member 4 is caused to move in the direction indicated by the arrow 5.

In accordance with a feature of the invention, the motion picture camera further comprises actuating means (here shown as including a two-armed lever 8) which is pivotable on a pin 7 and can change the axial position of the input member 4 against the opposition of the spring 4b as a function of a characteristic (preferably the sensitivity of film which is properly inserted into the housing of the camera. The film is stored in receptacles in the form of cassettes or cartridges 6, 6' which are provided with encoded information 6a, 6a' whose distance from the left-hand edge face 6b or 6b' of the respective cassette 6 or 6' is indicative of the speed or sensitivity of film which is confined in the cassette. The actuating lever 8 has a scanning portion or arm 8b which engages the encoded information 6a or 6a' of a properly inserted cassette 6 or 6' and a second portion information portion or arm 8a which abuts against the tip of the input member 4 of actuating means for the shutter 1, 2. The arm 8b of the actuating lever 8 is biased clockwise, as viewed in FIG. 1 or 2, by a helical spring 9 which maintains the scanning arm 8b in engagement with the information 6a or 6a' on the properly inserted cassette 6 or 6' and tends to pivot the arm 8a away from the input member 4. The cassette 6 or 6' is assumed to be insertable into a chamber of the housing in the direction indicated by arrow A and to be removable by moving counter to the direction indicated by the arrow A.

The cassette 6 of FIG. 1 is assumed to contain a supply of highly sensitive motion picture film. Therefore, the encoded information 6a (e.g., a ledge or shoulder on the casing of the cassette 6) is located rather close to the edge face 6b. Consequently, when the cassette 6 is properly inserted into the housing of the motion picture camera, the spring 9 is caused to expand and the lever 8 is pivoted counterclockwise to the extent which is indicative of the high sensitivity of film in the cassette 6. The input member 4 is shown as being depressed all the way (see the position of the pin 4a with respect to the helical slot 3a of the hollow shaft 3) and the size of the opening 50 has been increased to a maximum value which is best suited for the making of exposures with sensitive film in a relatively dark area and without resorting to an electronic flash unit or an analogous source of artificial light. In other words, the rotary shutter including the blades 1, 2 then furnishes a succession of relatively long exposure times which render it possible to make satisfactory exposures at dusk, dawn, on a very cloudy day, or in relatively weak artificial light furnished by one or more conventional light bulbs or the like but without necessitating the use of artificial light sources which are normally necessary for the making of exposures under the just outlined circumstances.

FIG. 2 illustrates a second cassette 6' having encoded information 6a' which is more distant from the edge face 6b'. Therefore, the properly inserted cassette 6' causes a smaller counterclockwise pivotal movement of the actuating lever 8 and the axial position of the input member 4 reflects the lower sensitivity of motion picture film in the cassette 6'. This film is assumed to have an average sensitivity and is supposed to be used in bright daylight. Therefore, the size of the opening 50 must be reduced so that the shutter will furnish shorter exposure times which, in combination with the sensitivity of film in the cassette 6', will insure the making of satisfactory exposures in bright daylight.

It is further within the scope of the invention to provide the camera with some means for automatically disengaging the arm 8b of the actuating lever 8 prior to insertion of a cassette 6 or 6' into the housing of the camera and/or prior to withdrawal of the cassette 6 or 6' from the housing. This can be achieved by providing the customary door for the chamber which receives the cassette 6 or 6' with a projection or the like which automatically moves the actuating lever 8 to an inoperative position as soon as the door is moved to open position and for as long as the door remains in open position. This insures that a cassette 6 or 6' can be readily loaded into and/or withdrawn from the camera without any damage to the actuating lever 8 and/or to the adjusting means for the shutter blade 2. It is further clear that each of the cassettes 6, 6' may be provided with suitable means for holding the actuating lever 8 in an operative position except at the time when a cassette 6 or 6' is properly mounted in the housing.

The camera which is shown in FIGS. 1 to 3 insures that the exposure times (at a given speed of the shutter blades 1, 2) can be varied as a function of a characteristic (preferably sensitivity) of motion picture film which is properly inserted into the housing of the camera. This enables the operator of the camera to concentrate on the subject because the exposure times are selected and maintained automatically without requiring any attention on the part of the operator.

In our improved motion picture camera, the length of exposure times furnished by the shutter is a function of the sensitivity of selected motion picture film. Proper exposure times are selected without necessitating any deliberations or calculations on the part of the user. In fact, the user need not even know the sensitivity of film in a cassette as long as he or she is aware of the fact that a particular cassette contains film which can be used without electronic flash or the like for the making of exposures when the scene brightness is poor, or that a particular cassette contains film which can be used with advantage for the making of exposures in broad daylight. As mentioned above, the arrangement is preferably such that the shutter of the camera furnished relatively long exposure times when the selected film is one of high sensitivity, such as is satisfactory for the making of exposures at dusk, dawn, in a dimly lit area or under similar circumstances and the user of the camera does not have or does not wish to use a flash lamp, an electronic flash or an analogous source of artificial light. On the other hand, when the exposures are to be made in broad daylight with a film of average sensitivity, the shutter will preferably furnish relatively short exposure times to avoid the undesirable effects of camera shake.

It is further clear that a cassette which contains a highly sensitive motion picture film can also be used for the making of exposures in broad daylight if the casing of the cassette is provided with encoded information which causes the actuating lever 8 to effect such adjustment of the shutter that the blades 1, 2 define a small opening 50, i.e., that the shutter furnishes short exposure times.

FIGS. 4 and 5 illustrate a portion of a second motion picture camera whose housing H is indicated in FIG. 4 by phantom lines. The cassette 6 of FIG. 5 corresponds to the cassette 6 of FIG. 1, i.e., its encoded information 6a is rather close to the edge face 6b of the cassette. One of the differences between the cameras of FIGS. 1–3 and 4–5 is that the latter camera employs modified adjusting means for the rotary shutter including the blades 1 and 2. The adjusting means is of the type disclosed, for example, in German Utility Pat. Model No. 7,109,319 and comprises a pin-shaped input member 10 which is parallel to the common axis (shaft 300) of the blades 1, 2 and is movable radially of the shaft 300 to thereby change the angular position of the blade 2 relative to the blade 1. The input member 10 is assumed to orbit about the axis of the shaft 300 when the latter is driven by the motor of the motion picture camera.

Furthermore, the information-scanning actuating means for the input member 10 of adjusting means for the shutter shown in FIGS. 4 and 5 comprises a reciprocable motion transmitting member or slide 12 which is provided with an elongated slot 11a receiving two fixed guide pins 13 which are mounted in the housing H and confine the actuating member 12 to reciprocatory movement in and counter to the direction indicated by arrow D. The scanning portion of the member 12 comprises a projection or tooth 12b which is biased against the encoded information 6a or 6a' of a properly inserted cassette 6 or 6' by a helical spring 14. The actuating portion of the member 12 comprises an arm 11 which is bifurcated, i.e., it comprises two prongs 11a and 11b which straddle the input member 10 and are suitably curved to allow the input member 10 to orbit about the axis of the shaft 300 when the latter drives the shutter blades 1, 2 at a selected speed. If the actuating member 12 is caused by the spring 14 to move in the direction indicated by the arrow D, the prongs 11a, 11b of the bifurcated adjusting arm 11 move the input member 10 toward the shaft 300 to thereby change the size of the opening 50 in one direction. When the actuating member 12 is caused to move upwardly by the encoded information of a properly inserted cassette (see the cassette 6 of FIG. 5), the arm 11 causes the input member 10 of the adjusting means for the shutter to move away from the shaft 300 so that the size of the opening 50 is changed in the opposite direction. At least the curvature of the prong 11b is selected in such a way that, when the shaft 300 rotates the blades 1 and 2, the input member 10 can find its way into the space between the prongs 11a, 11b even if the position of the actuating member 12 changes while the shaft 300 is in motion. However, this is not likely to occur since the actuating member 12 is normally adjusted only when the chamber for the cassette 6 or 6' is accessible, i.e., when the shaft 300 is idle.

The arm 11 may but need not form an integral part of the actuating member 12.

Another feature of the camera shown in FIGS. 4 and 5 resides in the provision of a light intensity modifying device in the form of a grey filter 15 having portions of different light transmissivity. This filter is movable relative to a photosensitive transducer 16 (e.g., a resistor) which forms part of means for adjusting the aperture size furnished by a diagrammatically illustrated diaphragm 70. The transducer 16 is exposed to scene light to insure that the size of the aperture furnished by the diaphragm 70 is a function of prevailing scene brightness. The filter 15 is mounted on the actuating member 12 and is capable of influencing the amount of scene light which reaches the transducer 16 in dependency on the sensitivity of film F or F' in the cassette 6 or 6'. Thus, the actuating member 12 can insure that the opening 50 defined by the shutter including the blades 1, 2 and the aperture furnished by the diaphragm 70 can be selected as a function of a characteristic of motion picture film in that cassette or receptacle which is properly mounted in the housing H of the motion picture camera.

It is clear that the filter 15 can be replaced by an adjustable auxiliary diaphragm (e.g., an iris diaphragm) or any other suitable sensitivity modifying means which is controlled by actuating member 12 in dependency on the sensitivity of film in an inserted cassette and which in turn controls the amount of scene light that reaches the transducer 16 of the adjusting means for the diaphragm 70. Also, the filter 15 or the just mentioned iris diaphragm can be replaced with a simpler auxiliary diaphragm, for example, an auxiliary diaphragm having a customary horn-shaped light transmitting aperture.

Referring finally to FIG. 6, there is shown a portion of a third motion picture camera which is assumed to embody all the structure shown in FIGS. 4-5 and is further provided with overriding means for changing the position of a slightly modified actuating member 112 independently of the information which is encoded on a cassette 6 or 6' as well as independently of the spring 14 (not shown in FIG. 6). The actuating member 112 has a slot 12c for the shank 17 of an overriding knob 18 which is movably mounted in the housing H (not shown in FIG. 6) and can be displaced by hand to thereby slide the member 112 in the directions indicated by a double-headed arrow E, i.e., to move the tooth 12b into and from engagement with the encoded information 6a or 6a' of a properly inserted cassette.

The knob 18 can be used with advantage when the user of the camera wishes to select exposure times which differ from automatically selectable exposure times as well as when the housing of the camera receives cassettes which are not provided with encoded information indicating the sensitivity of film therein. For example, the user may select the exposure times when the cassette in the housing contains a highly sensitive film which is suitable for exposures in daylight. The user then manually reduces the length of exposure times to make sure that the frames of film are not overexposed when the exposures are being made in daylight.

The improved motion picture camera is susceptible of many additional modifications. For example, the shutter may be of the type wherein one or more blades are slidable rather than turnable to thereby change the size of the light-admitting opening. Also, the actuating lever 8 or the actuating member 12 can be replaced by an actuating device which performs a composite movement in response to insertion of a cassette having information indicating a characteristic of the film therein. Still further, the camera can be designed to receive three or more different types of cassettes each having differently positioned encoded information thereon to indicate one of three or more different types of motion picture film. The cassette 6 of FIG. 5 is assumed to contain motion picture film whose sensitivity is 15 in DIN Norms, and the cassette 6 of FIG. 4 is assumed to contain motion picture film whose sensitivity is 21 in DIN Norms.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of the equivalence of the claims.

What is claimed as new and desired to be protected by Letters Patent is set forth in the appended claims:

1. In a photographic apparatus for use with cassettes or analogous receptacles containing motion picture film and having encoded information which is indicative of a characteristic, particularly the sensitivity, of film therein, a combination comprising a housing arranged to support receptacles containing films of different characteristics; adjustable mobile shutter means mounted in said housing and defining a light-admitting opening of variable size whereby the size of said opening at a given speed of said shutter means determines the length of exposure times furnished by said shutter means; adjusting means mounted in said housing and actuatable to adjust said shutter means; and information-scanning actuating means mounted in said housing to actuate said adjusting means and to thus effect an adjustment of said shutter means as a function of the characteristic of motion picture film in that receptacle whose encoded information is scanned by said actuating means.

2. A combination as defined in claim 1, wherein said shutter means is a rotary shutter including first and second light obstructing elements rotatable about a common axis and defining said opening, at least one of said elements being movable by said adjusting means relative to the other of said elements about said common axis to thereby change the size of said opening.

3. A combination as defined in claim 1, wherein said actuating means comprises a lever which is pivotably mounted in said housing and comprises first and second portions, and means for biasing said first portion of said lever against the encoded information on a receptacle in said housing, said adjusting means comprising a mobile input member and means for biasing said input member against said second portion of said lever.

4. A combination as defined in claim 1, wherein said actuating means comprises a motion transmitting member which is reciprocable in said housing and comprises first and second portions, and means for biasing said first portion of said member against the encoded information on a receptacle in said housing, said adjusting means comprising a mobile input member receiving motion from said second portion of said motion transmitting member.

5. A combination as defined in claim 4, wherein said second portion of said motion transmitting member is bifurcated and straddles said input member.

6. A combination as defined in claim 1, further comprising an adjustable diaphragm and means for adjusting said diaphragm as a function of the characteristic of film in that receptacle whose information is scanned by said actuating means.

7. A combination as defined in claim 6, wherein said diaphragm adjusting means comprises a photosensitive element which is exposed to scene light and is arranged to adjust the diaphgram as a function of the intensity of light impinging thereon, and light intensity modifying means operatively connected with one of said actuating and adjusting means to modify the intensity of light impinging on said photosensitive element as a function of the position of said one means.

8. A combination as defined in claim 7, wherein said light intensity modifying means is a filter.

9. A combination as defined in claim 7, wherein said light intensity modifying means is an auxiliary diaphragm.

10. A combination as defined in claim 7, wherein said one means is said actuating means.

11. A combination as defined in claim 1, further comprising overriding means operable to actuate said adjusting means independently of the characteristic of film in a receptacle in said housing.

12. A combination as defined in claim 11, wherein said actuating means is movable between a plurality of positions each of which corresponds to a different size of said opening and said overriding means is operatively connected with said actuating means.

13. A combination as defined in claim 11, wherein said overriding means is movable by hand to a position in which said actuating means is disengaged from the encoded information on a receptacle in said housing.

* * * * *